(12) United States Patent
Konchitsky

(10) Patent No.: US 7,706,821 B2
(45) Date of Patent: *Apr. 27, 2010

(54) NOISE REDUCTION SYSTEM AND METHOD SUITABLE FOR HANDS FREE COMMUNICATION DEVICES

(76) Inventor: Alon Konchitsky, 20488 Stevens Creek Blvd., Apt. 1402, Cupertino, CA (US) 95014

( * ) Notice: Subject to any disclaimer, the term of this patent is extended or adjusted under 35 U.S.C. 154(b) by 526 days.

This patent is subject to a terminal disclaimer.

(21) Appl. No.: 11/697,896

(22) Filed: Apr. 9, 2007

(65) Prior Publication Data

US 2008/0044036 A1 Feb. 21, 2008

Related U.S. Application Data

(60) Provisional application No. 60/805,266, filed on Jun. 20, 2006.

(51) Int. Cl.
*H04B 7/01* (2006.01)

(52) U.S. Cl. .................. 455/501; 455/569.1; 455/41.2; 455/556.1; 455/114.2; 455/570

(58) Field of Classification Search ............... 455/41.2, 455/41.1, 41.3, 3.06, 420, 425, 502, 67.16, 455/552, 190.3, 90.1, 556.1, 569.1, 114.2, 455/90.3, 501, 67.13; 318/326, 361, 151, 318/74

See application file for complete search history.

(56) References Cited

U.S. PATENT DOCUMENTS

| | | | | |
|---|---|---|---|---|
| 3,644,674 A | * | 2/1972 | Mitchell et al. | 379/392 |
| 5,757,216 A | * | 5/1998 | Murata | 327/156 |
| 5,969,838 A | * | 10/1999 | Paritsky et al. | 398/136 |
| 6,415,034 B1 | * | 7/2002 | Hietanen | 381/71.6 |
| 2007/0021958 A1 | * | 1/2007 | Visser et al. | 704/226 |
| 2007/0038442 A1 | * | 2/2007 | Visser et al. | 704/233 |
| 2008/0013749 A1 | * | 1/2008 | Konchitsky | 381/94.7 |
| 2008/0201138 A1 | * | 8/2008 | Visser et al. | 704/227 |
| 2008/0285774 A1 | * | 11/2008 | Kanamori et al. | 381/94.3 |

* cited by examiner

*Primary Examiner*—Tan Trinh
(74) *Attorney, Agent, or Firm*—Steven A. Nielsen; Allman & Nielsen, P.C

(57) ABSTRACT

A noise reduction system and method suitable for hands-free communication comprises a first microphone located in a wireless or cordless headset and a second microphone located within a separate communication device. The first microphone may be placed within a headset attached to or near the ear of the user while the second microphone may be located further away from the user's mouth. The first microphone collects the intended voice signal and ambient background or environmental noise while the second microphone primarily collects ambient noise rather than a voice signal. The inputs to the two microphones are synchronized and the ambient noise of the second microphone is used to compensate or remove noise from the first microphone, such as by subtracting the noise from the second microphone from the input of the first microphone. Noise reduction or noise cancellation is achieved through continuous time quadrant modulation, environmental noise counterbalancing, and/or through other means.

8 Claims, 7 Drawing Sheets ical noise levels and reduce or cancel the environmental noise prior to sending the voice communication over cellular telephone communication links, voice over packets links which are wired or wireless, IP telephony, Internet telephony, and sometimes Digital IP phone.

NOISE REDUCTION SYSTEM AND METHOD SUITABLE FOR HANDS FREE COMMUNICATION DEVICES

RELATED APPLICATIONS

This application is related to and claims the benefit of priority under 35 U.S.C. §119 to U.S. Provisional Application Ser. No. 60/805,266 filed 20 Jun. 2006 and entitled Noise Reduction System Suitable For Hands Free Communication Devices by Alon Konchitsky, the contents of which application are hereby incorporated by reference.

BACKGROUND

1. Field of the Invention

The present invention relates generally to voice communication systems, devices, telephones, and methods, and more specifically, to systems, devices, and methods that automate control in order to correct for variable environmental noise levels and reduce or cancel the environmental noise prior to sending the voice communication over cellular telephone communication links, voice over packets links which are wired or wireless, IP telephony, Internet telephony, and sometimes Digital IP phone.

2. Background of the Invention

Voice communication devices such as cellular telephones and wireless telephones and communications devices other than cellular telephones have become ubiquitous; they show up in almost every environment. These systems and devices and their associated communication methods are referred to by a variety of names, such as but not limited to, cellular telephones, cell phones, mobile phones, wireless telephones in the home and the office, and devices such as personal data assistants (PDAs) that include a wireless or cellular telephone communication capability. They are used in the home, at the office, in the car, on a train, at the airport, at the beach, at restaurants and bars, on the street, and almost any other imaginable venue. As might be expected, these diverse environments have relatively higher and lower levels of background, ambient, or environmental noise. For example, there is generally less noise in a quiet home than there is in a crowded bar. And, this noise is picked up by the microphone of the communications device and if at sufficient levels, degrades the intended voice communication and though possibly not known to the user of the communications device, uses up more bandwidth or network capacity than is necessary, especially during non-speech segments of the two-way conversation when a user is not speaking at his or her telephone.

A cellular network is a radio network made up of a number of radio cells (or just cells) each served by a fixed transmitter, normally known as a base station. These cells are used to cover different geographical areas in order to provide radio coverage over a wider geographical area than the area of one cell. Cellular networks are inherently asymmetric with a set of fixed main transceivers each serving a cell and a set of distributed (generally, but not always, mobile) transceivers which provide services to the network's users.

The primary requirement for a cellular network is that the each of the distributed stations needs to distinguish signals from their own transmitter from the signals from other transmitters. There are two common solutions to this requirement, frequency division multiple access (FDMA) and code division multiple access (CDMA). FDMA works by using a different frequency for each neighboring cell. By tuning to the frequency of a chosen cell, the distributed stations can avoid the signal from other neighbors. The principle of CDMA is more complex, but achieves the same result; the distributed transceivers can select one cell and listen to it. Other available methods of multiplexing such as polarization division multiple access (PDMA) and time division multiple access (TDMA) cannot be used to separate signals from one cell to the next since the effects of both vary with position, making signal separation practically impossible. Orthogonal frequency division multiplex (OFDM) in principal, consists of frequencies orthogonal to each other. Time division multiple access, however, is used in combination with either FDMA or CDMA in a number of systems to give multiple channels within the coverage area of a single cell.

In the case of a typical taxi company, each radio has a selector knob or button. The knob or button acts as a channel selector and allows the radio to tune to different frequencies. As the drivers and their vehicles move around, they change from channel to channel. The drivers know which frequency covers approximately what area, when they don't get a signal from the previously selected transmitter, they may typically also try other channels until they find one which works or on which they are able to receive or monitor communications in their local area. Usually, the taxi drivers only speak one at a time, as invited by the operator or according to voice traffic on the channel, in a sense time division multiplexed system.

The wireless world comprises the following exemplary, but not limited communication schemes: time based and code based. In the cellular mobile environment these techniques are named under TDMA (time division multiple access) which comprises but not limited to the following standards GSM, GPRS, EDGE, IS-136, PDC, and the like; and CDMA (code division multiple access) which comprises but not limited to the following standards: CDMA one, IS-95A, IS-95B, CDMA2000, CDMA 1xEvDv, CDMA 1xEvDo, WCDMA, UMTS, TD-CDMA, TDS-DMA, OFDM, WiMax, WiFi, and others).

For the code division based standards or orthogonal frequency division, as the number of subscribers grows and average minutes per month increase, more and more mobile calls typically originate and terminate in noisy environments. The background or ambient noise degrades voice quality.

For the time based schemes, like GSM or GPRS or Edge schemes, improving the end-user voice signal-to-noise ratio (SNR), improves the listening experience for users of existing TDMA (time division multiple access) based networks, by improving the received speech quality by employing background noise reduction or cancellation at the sending or transmitting device.

Significantly, in an on-going cellular telephone call or other communication from an environment having relatively higher environmental noise, it is sometimes difficult for the party at the other end of the connection to hear what the party in the noisy environment is saying. That is, the ambient or environmental noise in the environment often "drowns out" the cellular telephone user's voice, whereby the other party cannot hear what is being said or even if they can hear it with sufficient volume the voice or speech is not understandable. This problem may even exist in spite of the conversation using a high data rate on the communications network.

Attempts to solve this problem have largely been unsuccessful. Both single microphone and two microphone approaches have been attempted. For example, U.S. Pat. No. 6,415,034 (the "Hietanen patent") describes the use of a second background noise microphone located within an earphone unit or behind an ear capsule. Digital signal processing is used to create a noise canceling signal which enters the speech microphone. Unfortunately, the effectiveness of the method disclosed in the Hietanen patent is compromised by acoustical leakage, that is where ambient or environmental noise leaks past the ear capsule and into the speech microphone. The Hietanen patent also relies upon complex and power consuming expensive digital circuitry that may generally not be suitable for small portable battery powered devices such as pocket able cellular telephones. Another example is U.S. Pat. No. 5,969,838 (the "Paritsky patent") which discloses a noise reduction system utilizing two fiber optic microphones that are placed side-by-side next to one another. Unfortunately, the Paritsky patent discloses a system using light guides and other relatively expensive and/or fragile components not suitable for the rigors of cell phones and other mobile devices. Neither Paritsky nor Hietanen address the need to increase capacity in cellular telephone-based communication systems.

Therefore, there is a need in the art for a method of noise reduction or cancellation that is robust, suitable for mobile use, and inexpensive to manufacture. The increased traffic in cellular telephone based communication systems has created a need in the art for means to increase signal to noise ratios in communication devices.

Whatever the name, voice over Internet protocol (VoIP) is the routing of voice conversations over the Internet or any other Internet Protocol (IP)-based network. The voice data flows over a general-purpose packet-switched network, instead of traditional dedicated, circuit-switched voice transmission lines. The protocols used to carry voice signals over the IP network are commonly referred to as Voice over IP or VoIP protocols. Voice over IP traffic might be deployed on any IP network, including for example, networks lacking a connection to the rest of the Internet, such as for instance on a private building-wide LAN.

SUMMARY

The present invention provides a novel system and method for monitoring the noise in the environment in which a cellular telephone is operating and canceling the environmental noise before the environmental noise is transmitted to the other party so that the party at the other end of the voice communication link can more easily hear what the cellular telephone user is transmitting.

The present invention preferably employs noise reduction and or cancellation technology that is operable to attenuate or even eliminate pre-selected portions of an audio spectrum. By monitoring the ambient or environmental noise in the location in which the cellular telephone is operating and applying noise reduction and/or cancellation protocols at the appropriate time via analog and/or digital signal processing, it is possible to significantly reduce the ambient or background noise to which a party to a cellular telephone call might be subjected.

In one aspect of the invention, the invention provides a system and method that enhances the convenience of using a cellular telephone or other wireless telephone or communications device, even in a location having relatively loud ambient or environmental noise.

In another aspect of the invention, the invention provides a system and method for canceling ambient or environmental noise before the ambient or environmental noise is transmitted to another party.

In yet another aspect of the invention, the invention monitors ambient or environmental noise via a second microphone associated with a cellular telephone, which is different from a first microphone primarily responsible for collecting the speaker's voice, and thereafter cancel the monitored environmental noise.

In still another aspect of the invention, the invention optionally provides an enable/disable switch on a cellular telephone device to enable/disable the noise reduction and or cancellation features of the invention.

These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

The present invention provides a novel and unique background noise or environmental noise reduction and/or cancellation feature for a communication device such as a cellular telephone, wireless telephone, cordless telephone, recording device, a handset, and other communications and/or recording devices. While the present invention has applicability to at least these types of communications devices, the principles of the present invention are particularly applicable to all types of communications devices, as well as other devices that process or record speech in noisy environments such as voice recorders, dictation systems, voice command and control systems, and the like. For simplicity, the following description employs the term "telephone" or "cellular telephone" as an umbrella term to describe the embodiments of the present invention, but those skilled in the art will appreciate that the use of such term is not to be considered limiting to the scope of the invention, which is set forth by the claims appearing at the end of this description.

Figure 1:
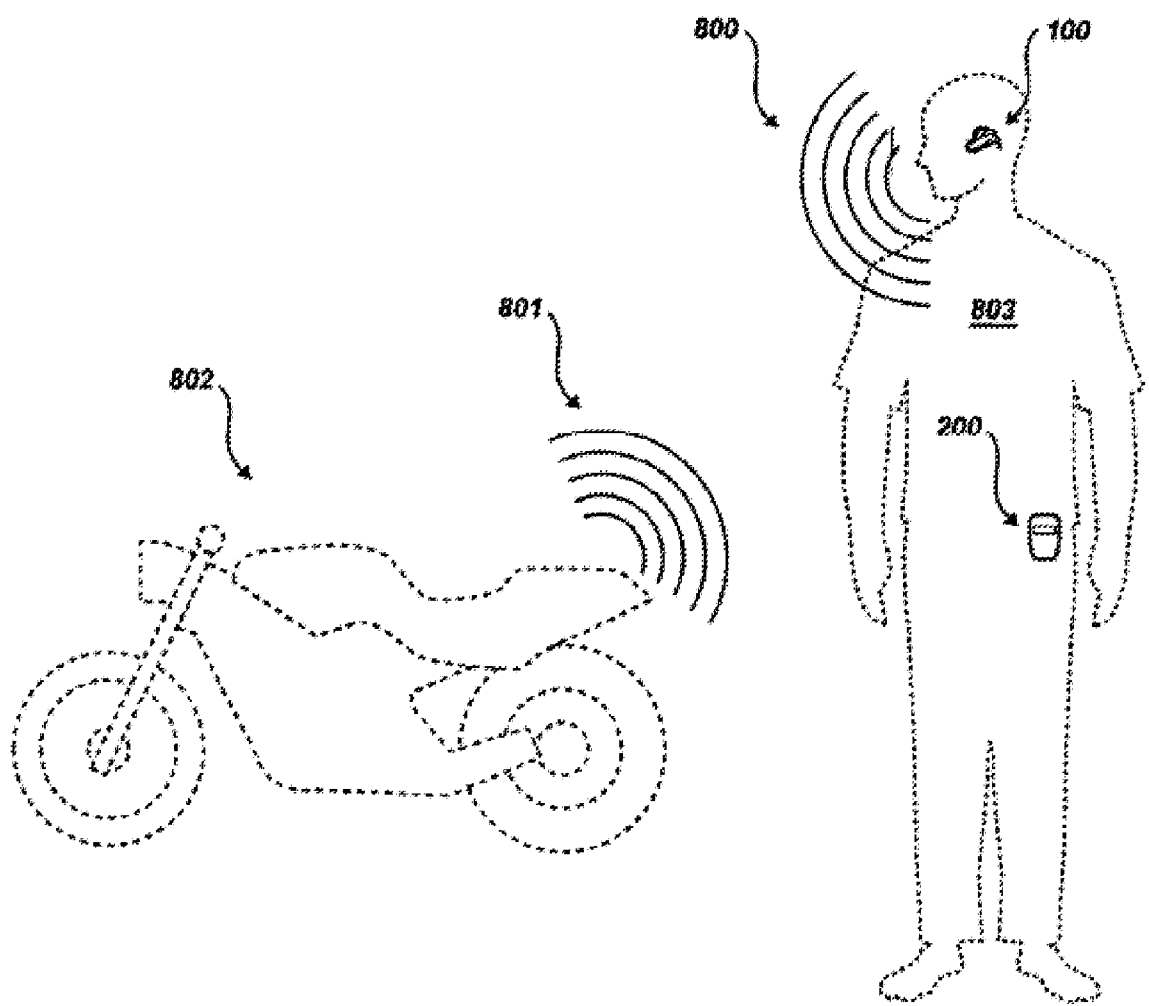
FIG. 1 is diagram of an exemplary embodiment of the invention operating in an urban environment.

FIG. 1 illustrates an exemplary cellular telephone 200 or handset or other device having a speech or other sound input, remote headset 100 or earpiece worn by a person 803 in a noisy environment such as, for a non-limiting example, where a motorcycle 802 or other noise source is generating background or environmental noise 801. The user 803 is speaking and generating a speech signal 800 that reaches primarily the headset because the speaker is speaking directly into its microphone (though some of the environmental noise may also reach the microphone). The environmental noise 801 or undesired signal from the motorcycle (or other source) reaches the handset 200 and is the primary signal picked up by its microphone (because little if any of the speech will be picked up by the microphone because of the distance from the speaker's mouth) which in this case is worn in the user's belt.

Figure 2:
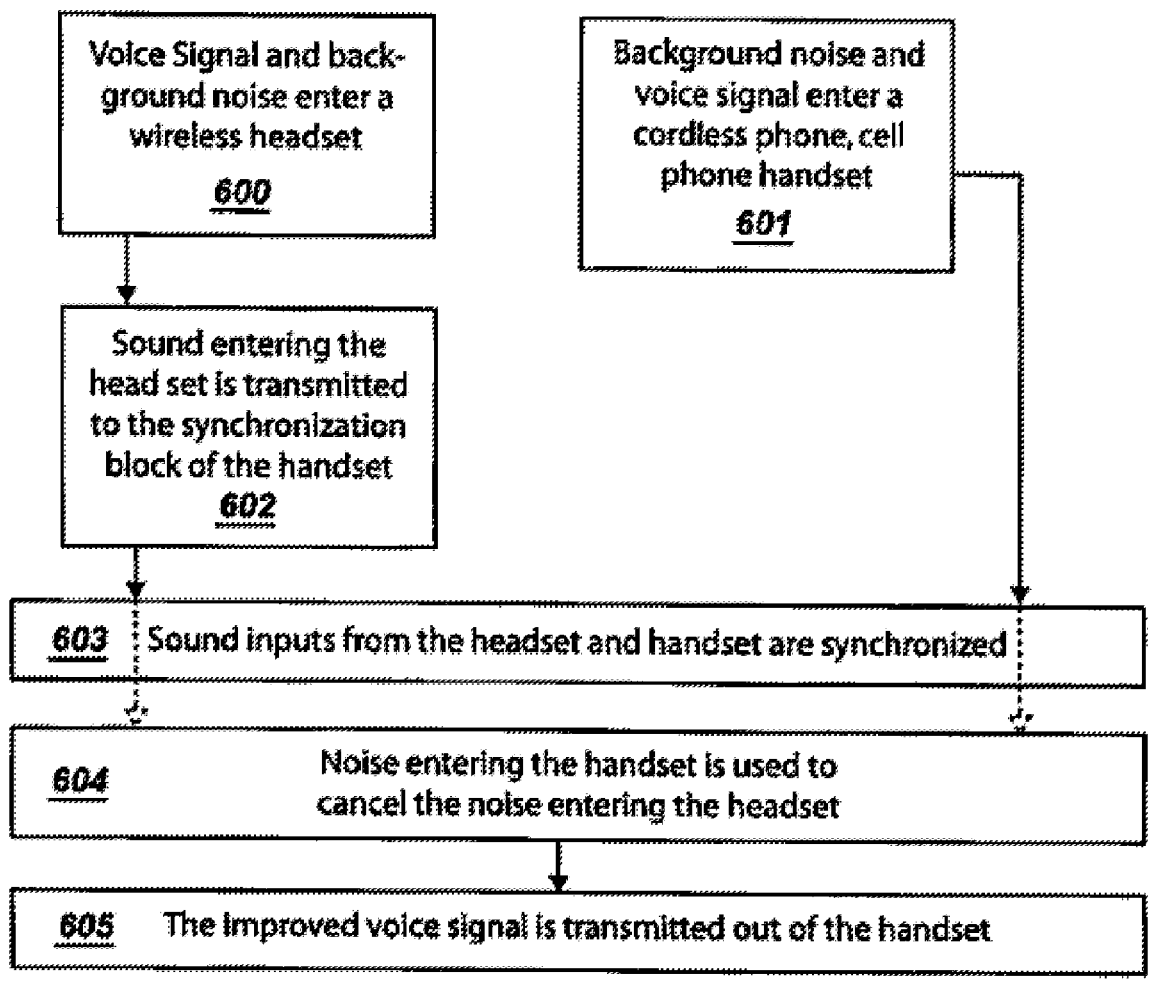
FIG. 2 is a diagrammatic flow chart illustrating an exemplary embodiment of the invention.

FIG. 2 is a diagrammatic flow chart illustrating an exemplary embodiment of a noise reduction method or procedure of the invention. At Step 600, voice signal or the desired signal and background noise enter a first microphone in a wireless headset. At Step 601, concurrently, background noise and voice signal enter a second microphone within a cell phone or handset or device. At Step 602, sound entering the headset is transmitted to the synchronization block of the handset. Synchronization may normally be required as the voice signal from the first microphone of the headset is processed in the headset because of the relative separation or delay in the first and second microphone signals. The processed voice signal of the first microphone is thus delayed in time, as compared to the input of the second microphone of the cell phone. The delay may in some instances be small as where the physical separation of the first and second microphones are small and any electrical delay associated with the first and second microphones or their associated circuitry is also small or non-existent. The delay may be adjusted in accordance with the actual delay, and such delay determination may be manually or automatically adjusted to achieve the best performance or sound fidelity. At Step 603, sound inputs from the headset and handset are synchronized within the cellular telephone (or other device). At Step 604, background or environmental noise entering the handset is used to cancel the noise entering the headset. At Step 605, the improved voice signal is transmitted out of the handset to an external receiver.

Figure 3A:
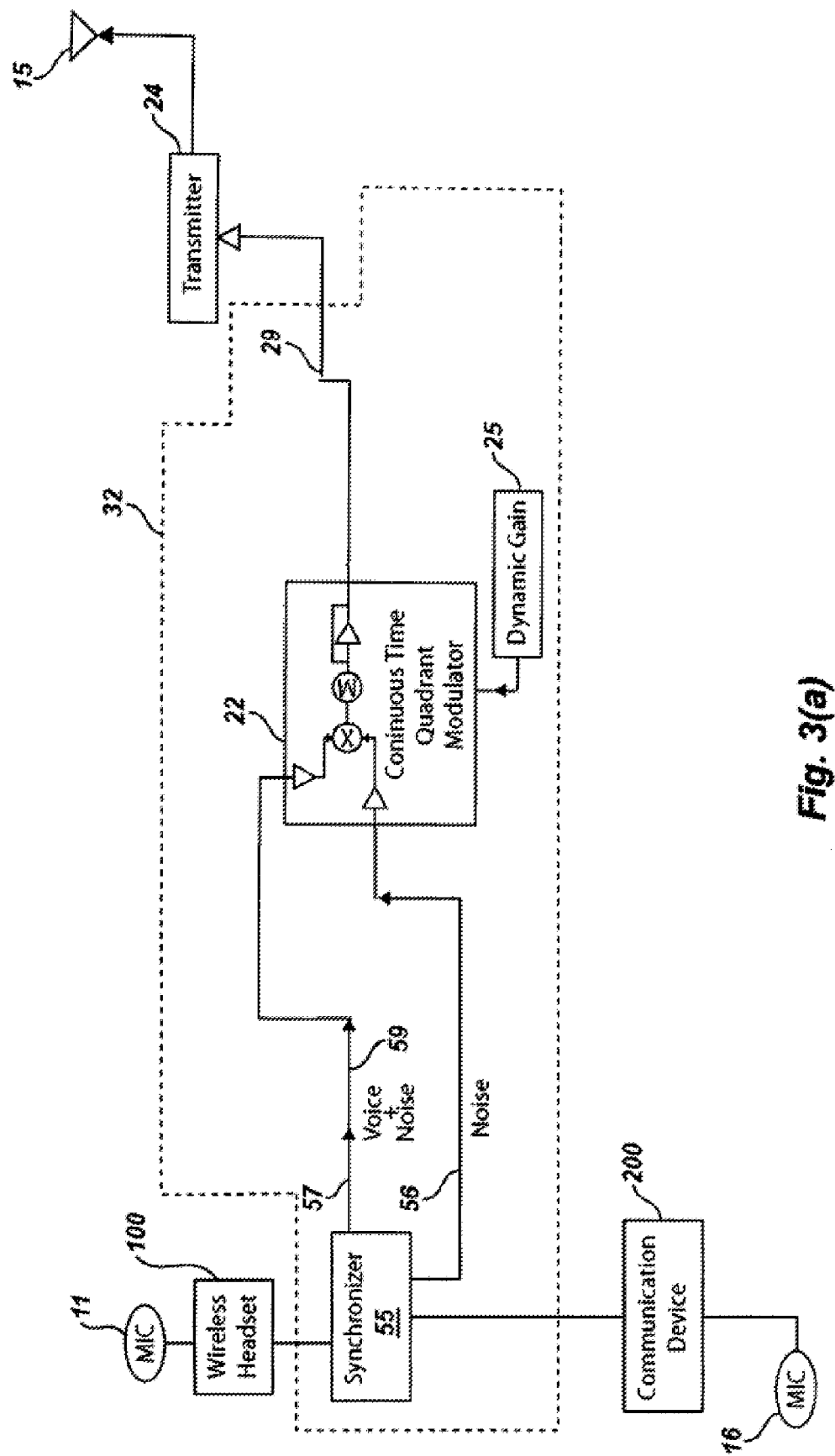
FIGS. 3 (a)-(c) are exemplary circuit diagrams of preferred embodiments of the invention.
Figure 3B:
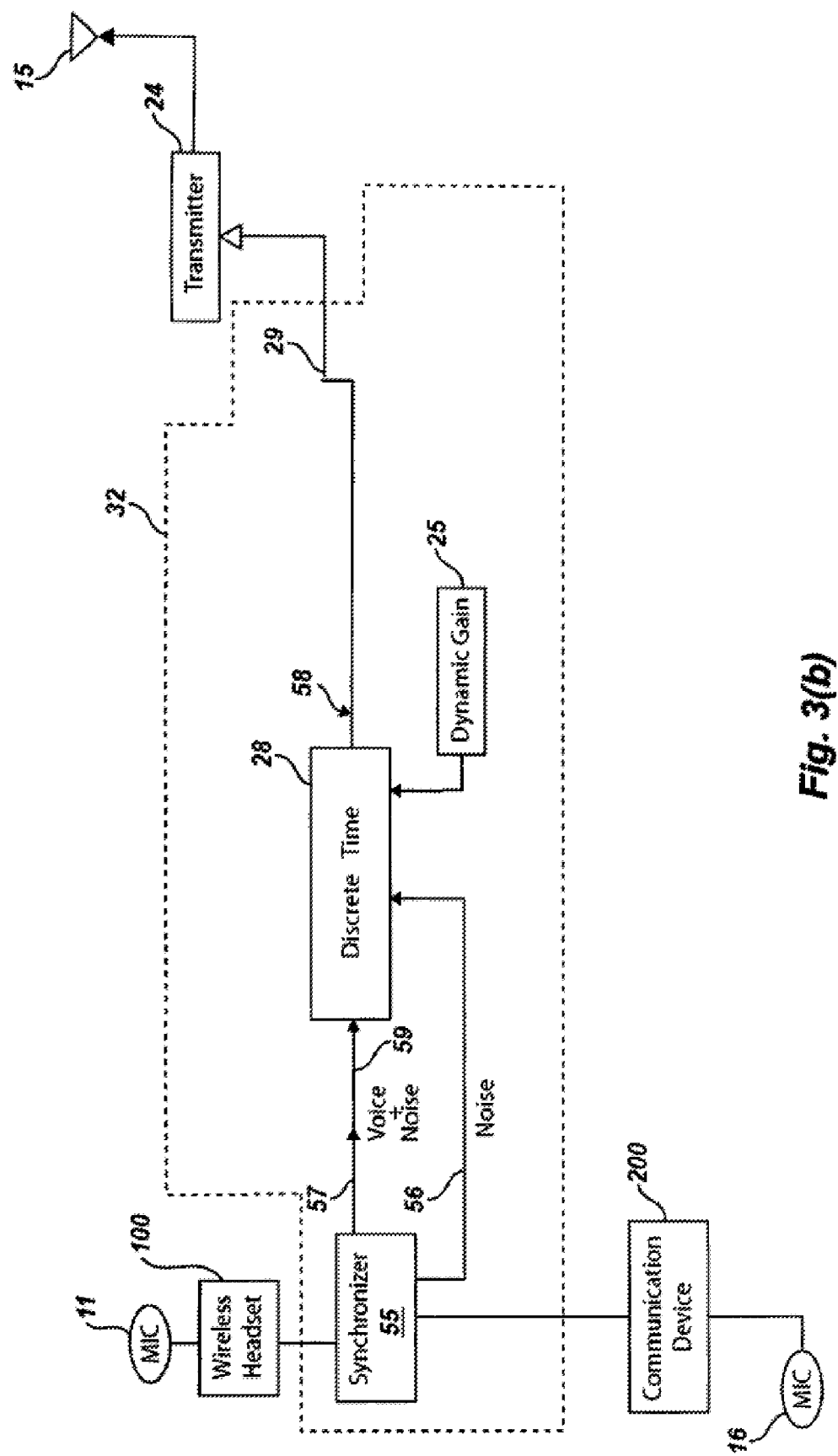
Figure 3C:
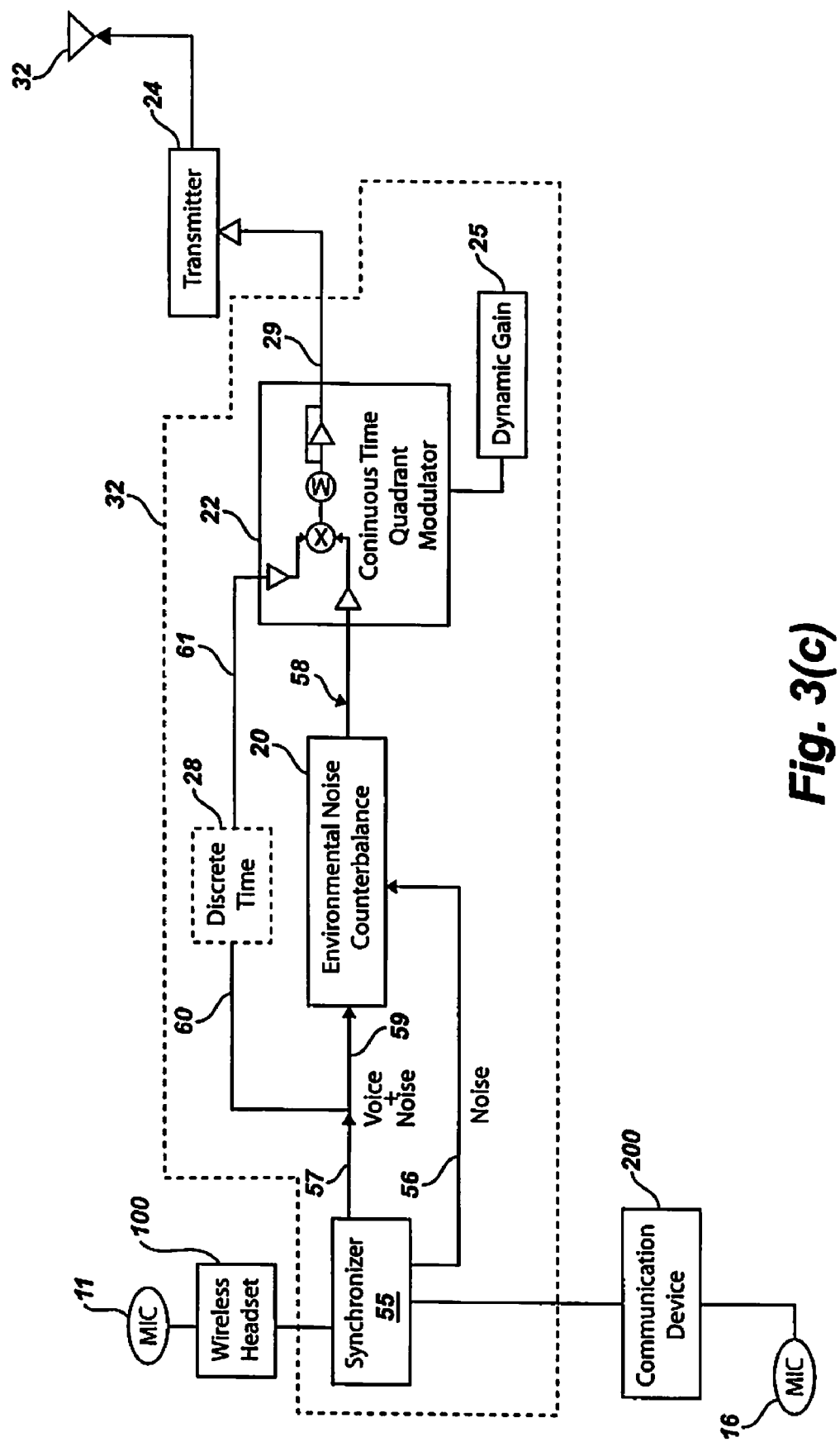

FIGS. 3 (*a*)-(*c*) illustrate the exemplary circuit diagrams for noise reduction comprising a noise reduction processing component 32, a wireless/cordless headset 100, a first microphone 11 in the wireless headset, and a communication device 200 containing a second microphone 16. Here, the headset (a remote component) may comprise a separate housing or enclosure from the housing or enclosure of the communications device.

In some embodiments, the first microphone 11 is used primarily for receiving voice signals from a user (or speaker) and may be placed closer to the user's mouth as compared to the second microphone 16. Both voice signal and background noise enter the first microphone 11 contained within a headset 100.

In some embodiments, the headset 100 can transmit or communicate a signal from microphone 11 to the synchronizer block 55 via one or more of: a physical wired transmission link via an electrically conductive medium, an optical transmission link via an optical fiber, and a wireless transmission link. When transmitting wirelessly with the communication device, it may use one or more of an 802.11x communications technique, a Bluetooth communication technique, a frequency-modulation (FM) radio-frequency communication technique, or any combination of these techniques.

In some embodiments, the second microphone 16 is provided (in addition to first microphone 11) for the principal purpose of sampling or detecting the ambient or environmental (background) noise other than the speaker's voice, i.e., second microphone 16 is dedicated substantially to picking up, collecting, or sensing and transducing environmental noise rather than a speaker voice signal. The environmental noise collected by microphone 16 may be used to subtract out (or cancel) environmental noise (not desired) collected from the first microphone 11 along with a desired speaker voice (desired). Input from the second microphone 16 enters the communication device 200 or handset and then enters the synchronizer circuit or processing block 55.

In some embodiments, the synchronizer circuit or processing block 55 is located within the communication device 200 and is needed to synchronize the inputs from first microphone 11 and second microphone 16 when there is a delay that is not otherwise compensated for. The input of the first microphone 11 is processed by the wireless headset 100 and then transmitted to the communication device 200 and is thus likely delayed as compared to the input from the second microphone 16 which travels directly to the synchronizer.

In some embodiments, the synchronizer circuit synchronizes the signals by at least one of a time synchronization, a phase synchronization, and a combination of a time and phase synchronization. When synchronizing the signals in time or phase, at least one of the signals is delayed so that the background signal component collected by the first microphone is substantially synchronized to the background signal component of the second microphone.

In some embodiments, the signal from the second microphone 16 travels though connection 56, while the signal from microphone 11 travels through connections 57 and 59, to either the continuous time quadrant modulator circuit or processing block 22 shown in FIG. 3 (*a*) for analog signal processing and/or to a discrete time unit or processor 28 shown in FIG. 3 (*b*) for digital signal processing after synchronization. Various techniques for adding and subtracting or otherwise combining the signal (noise) collected by microphone 16 from the signal (voice plus noise) collected by microphone 11 are known in the art, such as the use of operational amplifiers, differential amplifiers, comparators, and the like analog/digital circuits, may be utilized here. The result is that the environmental noise or background noise is eliminated or cancelled, or at least substantially reduced.

In some embodiments, the signals from microphones 11 and 16 may travel through first and second connections 57 and 59 into an environmental noise counterbalance circuit 20 after synchronization, and signal from the microphone 11 may alternatively travel through connections 57 and 60 into the discrete time circuit 28, before they travel through connection 58 and 61 respectively into the continuous time quadrant modulator circuit 22 as shown in FIG. 3 (*c*). The environmental noise counterbalance circuit 20, in accordance with well-known techniques, generates one or more counterbalanced signal(s) that are operable to attenuate or altogether cancel background or environmental noise that is not intended or desirable to be transmitted to another party. These counterbalanced signals are fed into continuous time quadrant modulator circuit 22 where these signals are mixed or combined with the composite signal of environmental noise plus voice from microphone 11. The discrete time unit 28 may be optionally utilized here to slow or controllably delay the progress or propagation of the composite signal emanating from the output of the microphone 11 so that when it reaches the continuous time quadrant multiplication block 22, the arrival time of the composite signal and the counterbalanced signal(s) generated by environmental noise reduction and or cancellation generator is/are synchronized.

In some embodiments, a dynamic gain circuit 25 may optionally but advantageously be applied to the continuous time quadrant modulator 22 or the discrete time unit 28 to alter the gain or weight applied to at least one of the signals from the first and the second microphone. The noise reduced combined signal 29 (environmental noise plus voice signal) is then passed to transmitter 24 (which, for a non-limiting example, includes a radio frequency modulator, and the like components required for the operation of the wired or wireless device) and ultimately to one or more of an antenna 15 (when present), a VoIP system and a VoIP wireless messenger (not shown here). In some instances the noise reduced signal 29 will have a noise reduction that sufficiently great that the signal 29 will appear to the listener to be noise free or substantially noise free.

Figure 4:
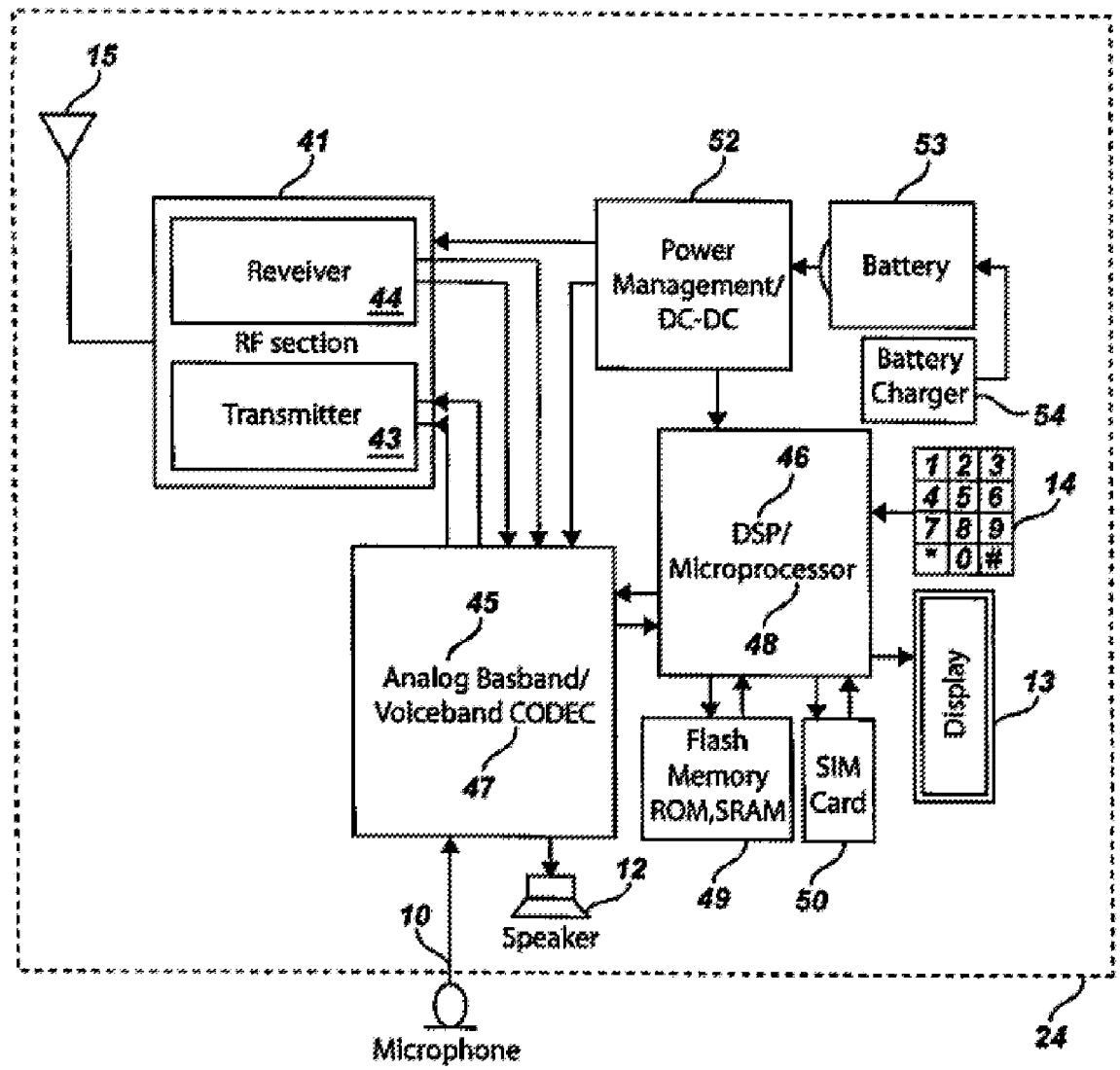
FIG. 4 is an exemplary circuit diagram of a portion of a typical cellular telephone.

FIG. 4 illustrates an exemplary block diagram typical of the major functional blocks of a cellular telephone of the type not having the noise reduction and cancellation processing of the invention. This architecture is described so that the manner in which the invention interoperates with and improves the performance may be better understood.

Radio-Frequency (RF) section or block 41 includes a transmit section 42 and a receive section 43 and is where the RF signal is filtered and down-converted to analog baseband signals for the receive signal. It is also where analog baseband signals are filtered and then up-converted and amplified to radio frequencies (RF) for the transmit signal. Analog Baseband block 45 is where analog baseband signals from RF receiver section 44 are filtered, sampled, and digitized before being fed into the Digital Signal Processing (DSP) section 46. It is also where coded speech digital information from the DSP section are sampled and converted to analog baseband signals which are then fed to the RF transmitter section 43. It will be understood that no radio-frequency (RF) section or antenna would be required for a wired line implementation of the invention.

The Voiceband Codec (VoCoder) 47 is where voice speech from the microphone 10 is digitized and coded to a certain bit rate (for example, 13 kbps for GSM) using the appropriate coding scheme (that may be chosen or selected to achieve a balance between perceived quality of the compressed speech and the overall cellular system capacity and cost). It is also where the received voice call binary information are decoded and converted in the speaker or speakerphone 12.

The digital signal processor (DSP) 46 is a highly customized processor designed to perform signal-manipulation calculations at high speed. The microprocessor 48 handles all of the housekeeping chores for the keyboard and display, deals with command and control signaling with the base station and also coordinates the rest of the functions on the board.

The ROM, SRAM, and Flash memory chips 49 provide storage for the phone's operating system and customizable features, such as the phone directory. The SIM card 50 belongs to this category, it stores the subscriber's identification number and other network information.

Power Management/DC-DC converter section 52 regulates from the battery 53 all the voltages required to the different phone sections. Battery charger 54 is responsible for charging the battery and maintaining it in a charged state.

Keypad 14 and display 13 provide an interface between a user and the internal components and operational features of the telephone.

In some embodiments, the synchronization performed by synchronization block 55 and/or discrete time block 28 of FIG. 3 could optionally be performed in baseband 45 or performed in software operating within the processors 46 and/or 47 rather than by a separate synchronization processing block, wherein the processor is a digital signal processor programmable using a software and/or a firmware to achieve the synchronization of the signals from the first and/or second microphones or signals derived from the first and/or second microphones.

Figure 5:
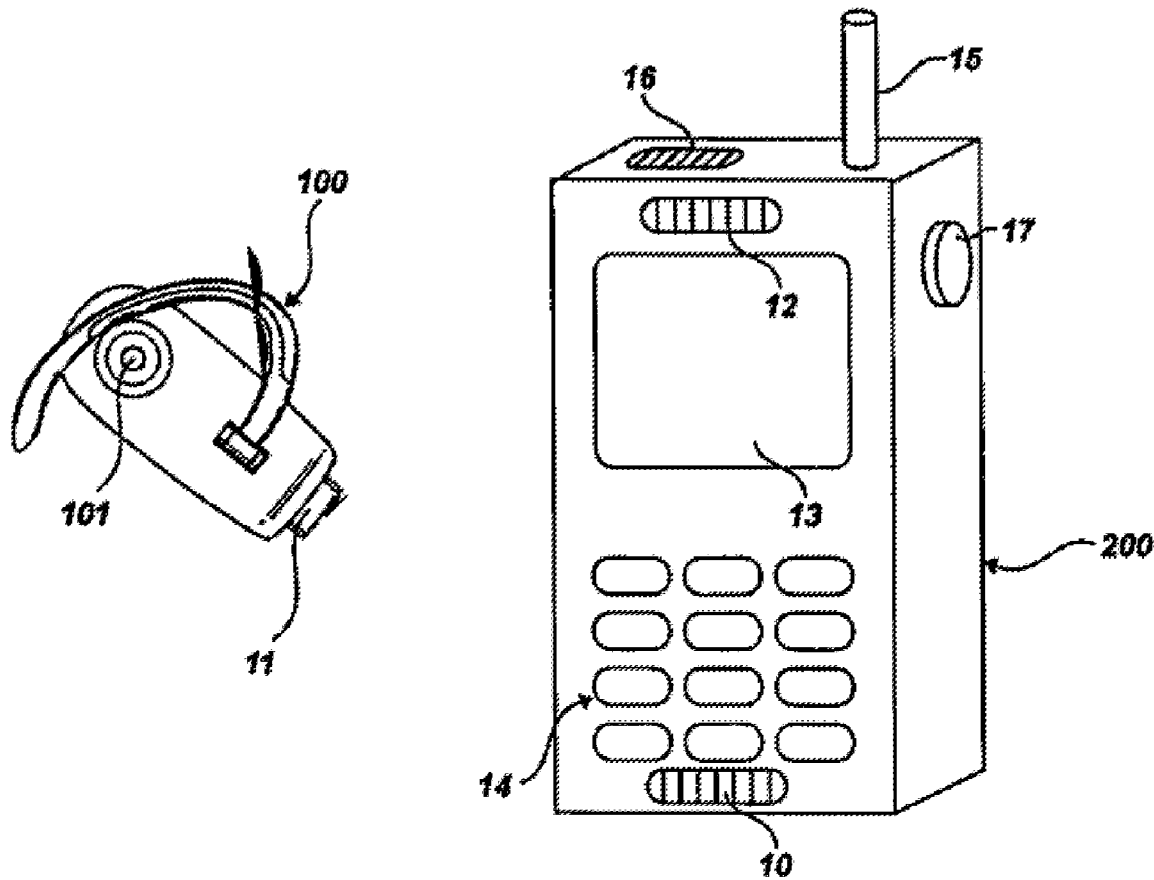
FIG. 5 is an exemplary diagram of a cellular telephone and headset consistent with an embodiment of the invention.

FIG. 5 illustrates an exemplary headset 100 and cellular telephone 200 that has a microphone 10 for use without headset 100, a speaker 12, a display screen 13, a keypad 14, and an antenna 15.

Cellular telephone 200 has a second microphone 16 for either continuous time or discrete time sampling of environmental noise level or signals. An environmental noise counterbalanced enable/disable button 17 or other switching or enabling and disabling means may also optionally be provided. The enable/disable button or feature 17 may be exposed on the surface of the housing or be available through a menu drive or selection options or telephone set up procedure.

Those skilled in the art will appreciate that speaker 12 may not normally be used when headpiece 100 is in use. Headpiece 100 has a speaker 101 that fits close to the user's ear. Dual speakers may be provided either providing monophonic or stereophonic signals.

Cellular telephone's 200 display screen 13 could be a touch screen display, which might incorporate keypad 14 as well as enable/disable button 17. Various other different displays and/or interfaces may be utilized as are known in the art.

The implementation with specialized microphones having particular directional characteristics, frequency response characteristics, internal noise canceling characteristics, or other response or transducer characteristics may provide different or additional sound reduction or cancellation when combined with the invention.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

I claim:

1. A system for improving the signal-to-noise ratio of a communication device, the system comprising:
   a first microphone operable to collect a composite signal including a voice signal component and/or a background noise signal component;
   a second microphone operable to collect a primarily background noise signal; and
   a noise reduction processing component operable to:
      receive and synchronize the signals collected by the first microphone and the second microphone;
      generate a noise reduced output signal by removing at least a portion of the background noise signal component from the composite signal collected by the first microphone using the primarily background noise signal collected by the second microphone;
   wherein the first microphone is positioned in proximity to the user's mouth and located in a remote component that is physically separate from the communication device;
   wherein the remote component is contained within a separate housing from a housing containing the communications device;
   wherein the remote component communicates with the communication device using at least one physical wired transmission link, wireless transmission link or optical transmission link;
   wherein the noise reduction processing component further comprises:
   wherein the noise reduction processing component further comprises a discrete time processing for slowing and controllable delaying the progresses or propagation of the signal from the first microphone and reducing background noise by subtracting the signal from the second microphone from the from the background noise component of the composite signal from the first microphone via digital signal processing.

2. The system according to claim 1, noise reduction processing component further comprises a continuous time quadrant modulation circuit operable to reduce background noise by subtracting the primarily background noise signal from the second microphone from the background noise component of the composite signal from the first microphone via analog signal processing.

3. The system according to claim 1, wherein the noise reduction processing component further comprises:
   a dynamic gain circuit operable to alter the gain or weight applied to at least one of the signals from the first and the second microphones, or to a signal derived from the first microphone or the second microphone; and
   an environmental noise counterbalance circuit operable to generate one or more counterbalanced signals that are operable to attenuate or altogether cancel background or environmental noise that is not intended or desirable to be transmitted to another party.

4. The system according to claim 1, wherein the communication device further comprises one or more of:
   a processor operable to synchronize of the signals collected by the first and the second microphones or signals derived from the first and/or second microphones;
   a transmitter operable to send the noise reduced output signal from the communication device to an external receiver; and
   wherein the processor is a baseband processor.

5. The system according to claim 4, wherein the processor is a digital signal processor programmable using a software and/or a firmware to achieve the synchronization of the signals from the first and/or second microphones or signals derived from the first and/or second microphones.

6. A method of improving the signal-to-noise ratio of a communication device of the type for receiving a spoken communication from the mouth of a user of the device, the method comprising the steps of:
   collecting a composite signal including a voice signal component and a background noise signal component via a first microphone;
   collecting a primarily background noise signal via a second microphone;
   receiving and synchronizing the signals collected by the first microphone and the second microphone; and
   generating a noise reduced output signal by removing at least a portion of the background noise signal component from the composite signal collected by the first microphone using the background noise signal collected by the second microphone collecting no voice signal component or only a low-amplitude voice signal component relative to that collected via the first microphone;
   transmitting the signal collected by the first microphone to the communication device via one or more of a physical wired transmission link, a wireless transmission link, and an optical transmission link;
   generating the noise reduced signal by subtracting the background noise signal from the second microphone from the background noise signal component of the composite signal from the first microphone using analog and digital signal processing;
   transmitting the noise reduced output signal out of the communication device to an external receiver;
   synchronizing the signals by at least one of a time synchronization, a phase synchronization, and a combination of a time and phase synchronization; and
   synchronizing the signals in time or phase by delaying at least one of the signals so that the background signal component collected by the first microphone is substantially synchronized to the background signal component of the second microphone.

7. A system for improving the signal-to-noise ratio of a communication device, the system comprising:
   means for collecting a composite signal including a voice signal component and a background noise signal component;
   means for collecting a primarily background noise signal;
   means for receiving and synchronizing the signals collected by the first microphone and the second microphone; and
   means for generating a noise reduced output signal by removing at least a portion of the background noise signal component from the composite signal using the background noise signal component from the composite signal collected by the first microphone using the background noise signal collected by the second microphone; and
      means for collecting no voice signal component or only a low-amplitude voice signal component relative to that collected via the first microphone:
   transmitting the signal collected by the first microphone to the communication device via one or more of a physical wired transmission link, a wireless transmission link, and an optical transmission link;
      means for generating the noise reduced signal by subtracting the background noise signal from the second microphone from the background noise signal component of the composite signal from the first microphone using analog and digital signal processing;

transmitting the noise reduced output signal out of the communication device to an external receiver;

means for synchronizing the signals by at least one of a time synchronization, a phase synchronization, and a combination of a time and phase synchronization; and synchronizing the signals in time or phase by delaying at least one of the signals so that the background signal component collected by the first microphone is substantially synchronized to the background signal component of the second microphone.

8. An apparatus for reducing the background noise in a communication device, the apparatus comprising:

a first microphone disposed within a first housing, wherein the first microphone is placed in close proximity to a speaker's mouth so as to collect a relatively high speaker voice signal;

a second microphone disposed within a second housing, wherein the second microphone is placed out of proximity to the speaker's mouth so that the second microphone receives no speaker voice signal or a greatly attenuated speaker's voice signal as compared to the voice signal collected by the first microphone;

a transmitter disposed within the first housing for transmitting a signal from the first microphone or a signal derived from the first microphone signal to a receiver within the second housing;

a synchronizer circuit or processor for synchronizing in time and/or in phase signals from the first microphone and the second microphone or two signals derived from the first and second microphone signals; and a background noise reduction circuit for generating a noise reduced voice output signal having a higher voice signal to background noise ratio by using the signal collected from the second microphone to reduce or cancel the background noise collected from the first microphone.

* * * * *